Patented Feb. 11, 1941

2,231,309

UNITED STATES PATENT OFFICE 2,231,309

PROCESS OF TREATING GASES FROM ALUMINUM FURNACES

Julius Weber, Neuhausen, Switzerland, assignor to Det norske Aktieselskab for Electrokemisk Industri, Oslo, Norway No Drawing. Application April 23, 1937, Serial No. 138,585. In Norway April 25, 1936

11 Claims. (Cl. 23—88)

In the production of aluminium according to the usual method of today (electrolysis of dissolved alumina in a fluoride melt) gases are evolved which carry with them some flue-dust. This flue-dust principally consists of soot and alumina. Some fluoride and iron oxide may also be carried along. The gases themselves, especially if selfbaking electrodes, the so-called Söderberg electrodes, are employed, consist mainly of a mixture of carbon monoxide, carbonic acid and air, but also often contain fluorine in a free and/or combined state, such for example as hydro-fluoric acid, and sulphur dioxide, thus having an acid reaction. The sulphur dioxide is formed by the sulphur content in the coal or pitch in the electrode mass. This sulphur dioxide has no value and may be allowed to escape into the atmosphere. The quantity of fluorine, however, which is lost with the escaping gases and the flue-dust means a considerable loss as it originates from the fluoride melt serving for dissolution of alumina and as an electrolyte.

Lately, many efforts have been made to recover and utilize fluorine from the gases and dust. One such process which has heretofore been employed consists in closing the electrolysis furnaces by means of a hood collecting the evolved gases over the bath surface. The gases are diluted by means of aspirated air and then washed with an alkaline solution of a sodium compound (sodium hydroxide or carbonate) which circulates in the process. Thereby a fluoride solution is gradually formed. When the wash-solution has taken up sufficient fluorine in the form of sodium fluoride and has been clarified by precipitation of the insoluble components it is treated with aluminium fluoride whereby cryolite is precipitated. When certain compounds ($Na_2SO_4$) have accumulated in the solution the mother liquor must be emptied into a canal or the like which in many places will be prohibited on account of its detrimental effects (poisoning of water).

According to the present invention the fluorine is recovered without formation of waste solutions. This is attained principally by leading the gases through an electro-filter which separates out in the form of dust the original dust content and the acid gases or vapors, especially fluorine and compounds thereof referred to in the claims hereof as "fluorine values." Alumina, soot and the small quantities of iron oxide are of course separated out without special arrangements, while the volatile acid compounds are chemically reacted with alkaline components and thereby changed to solid dust form before being passed through the electro-filter. For this purpose the gases are moistened with an aqueous solution of at least one alkaline substance before being led to the electro-filter. This is suitably effected by atomizing the alkaline solution.

It is known that a certain moisture of for instance 60% relative moisture is necessary to attain a good separation in the electro-filter. With gases which contain less than 60% relative moisture it is advisable to introduce water so that the water content will rise to approximately 60%. Thereby the point of condensation is raised; but it is desirable to avoid the introduction of such quantity of water that part of it will be present in the gases as cloudy drops. In that case the moisture content would during the cooling surpass 100% and apart from a poorer efficiency there would be another drawback: sparking between the electrodes of the electro-filter on account of condensed water. The air penetrating into aluminium electrolysis furnaces under the exhaust hood will in the furnaces be heated from room temperature to for example 100° C. so that it shows only a small relative moisture. This air in the gases is later on cooled in the system until it reaches the electro-filter, but will remain unsaturated with moisture. This circumstance is in the invention utilized for atomizing the alkaline solution serving to bind the acid components of the gases without formation of fog. The water in the solution evaporates immediately and the dissolved alkaline substance combines with the acid gas components to form a solid dust.

A soda solution is suitably employed for binding the acid components of the gases as it is very cheap. Sodium hydroxide may if desired also be used.

According to the new process the electro-filter will separate out the main part of the soot, alumina, fluorine compounds, some times sulphate and sulphite and iron oxide present and also small quantities of other impurities. Sulphate and sulphite are mainly formed by neutralization of $SO_2$ present in the gases by means of the injected alkaline solution. It is however, possible to only introduce so much alkaline solution that practically all fluorine but only a comparatively small part of the $SO_2$ is bound and precipitated in the electro-filter. Contrary to the above mentioned known process, the fluorine compounds are according to the present invention recovered without formation of waste solution.

The dust separated out in the electro-filter is according to a further development of the invention freed from water by heating. The tar is removed by dry distillation and the dust freed from carbon by a subsequent oxidizing treatment for instance by heating to ignition in the air. The resulting material is preferably made into cryolite and is used over again in the aluminium furnaces. The removal of water, distillation of tar and the oxidizing combustion of the dust may be combined as these operations are effected in the same apparatus, one after the other or partly at the same time.

Generally the gases will after having left the electro-filter still contain small amounts of fluorine compounds (for example 5% of the original quantity) and the greater part of the $SO_2$. It is therefore recommended to carry out a subsequent washing in a suitable apparatus after the gases have left the electro-filter, before they are let out into the atmosphere. In this manner the remaining portion of the gaseous acid components are removed. The washing apparatus is filled with an alkaline solution, preferably an aqueous solution of an alkali metal compound, for example a soda solution. Also when washing with an alkaline solution the formation of waste water may be avoided as the wash solution used which contains for example sodium fluoride, sodium sulphite and sodium sulphate, is treated with calcined lime or slaked lime whereby the fluorine is separated out in the form of calcium fluoride and part of the sulphur as calcium sulphite. The solution thus formed which now contains for example sodium hydroxide is led back to the washing department instead of fresh water solution so that no waste water is formed by this additional treatment. It is also possible to employ slaked lime directly as wash solution whereby the chemical treatment for precipitation of fluorine and sulphur compounds is avoided.

It is then easy enough to add fresh lime to replace that which is consumed.

The foregoing detailed description has been given for clearness of understanding and no undue limitation is to be inferred therefrom.

I claim:

1. The process of recovering fluorine values in waste gases from the electrolytic production of aluminium, which comprises treating the gases while hot from the furnace with an aqueous solution of an alkaline substance having the property of forming solid compounds with the fluorine values in the waste gases and thereby converting the fluorine values into solid compounds, utilizing the heat in the gases to volatilize the excess aqueous content of the solution, and separating the solid fluorine compounds from the remaining gases while the fluorine compounds are in suspension in the remaining gases.

2. The process of recovering fluorine values in waste gases from the electrolytic production of aluminium, which comprises treating the gases while hot from the furnace with an aqueous solution of an alkaline substance having the property of forming solid compounds with the fluorine values in the waste gases and thereby converting the fluorine values into solid compounds, utilizing the heat in the gases to volatilize the excess aqueous content of the solution, and separating by electrical precipitation the solid fluorine compounds from the remaining gases while the fluorine compounds are in suspension in the remaining gases.

3. The process of recovering fluorine values in waste gases from the electrolytic production of aluminium, which comprises treating the gases while hot from the furnace with an aqueous solution of a sodium compound having the properties of forming solid compounds with the fluorine values in the waste gases and thereby converting the fluorine values into solid compounds, utilizing the heat in the gases to volatilize the excess aqueous content of the solution, and separating by electrical precipitation the solid fluorine compounds from the remaining gases while the fluorine compounds are in suspension in the remaining gases.

4. The process of recovering fluorine values in waste gases from the electrolytic production of aluminium, which comprises treating the gases while hot from the furnace with an aqueous solution of sodium carbonate to form solid compounds with the fluorine values in the waste gases, utilizing the heat in the gases to volatilize the excess aqueous content of the solution, and separating by electrical precipitation the solid fluorine compounds from the remaining gases while the fluorine compounds are in suspension in the remaining gases.

5. The process of recovering fluorine values in waste gases from the electrolytic production of aluminium, which comprises atomization of an aqueous solution of sodium carbonate with the waste gases while hot from the furnace and thereby converting the fluorine values of the gases into solid compounds, utilizing the heat in the gases to volatilize the excess aqueous content of the solution, and separating by electrical precipitation the solid fluorine compounds from the remaining gases while the fluorine compounds are in suspension in the remaining gases.

6. The process of recovering fluorine values in waste gases from electrolytic production of aluminium, which comprises treating the gases while hot from the furnace with an aqueous solution of an alkaline substance having the properties of forming solid compounds with the fluorine values in the waste gases and thereby converting the fluorine values into solid compounds, utilizing the heat in the gases to volatilize the aqueous compound of the solution, separating by electrical precipitation the solid fluorine compounds from the remaining gases while the fluorine compounds are in suspension in the remaining gases, and heating the solid compounds so separated to remove the water and burn out the carbonaceous materials associated therewith.

7. The process of recovering fluorine values in waste gases from the electrolytic production of aluminium, which comprises treating the gases while hot from the furnace with an aqeous solution of sodium carbonate to form solid compounds with the fluorine values in the gases, utilizing the heat in the gases to volatilize the excess aqueous content of the solution, separating by electrical precipitation the solid fluorine compounds from the remaining gases while the fluorine compounds are in suspension in the remaining gases, and heating the solid compounds so separated to remove the water and burn out the carbonaceous materials associated therewith.

8. The process of recovering fluorine values in waste gases intermingled with flue dust from the electrolytical production of aluminium, which comprises treating the flue dust and gases while hot from the furnace with an aqueous solution of an alkaline substance having the properties of forming solid compounds with the fluorine values in the waste gases and thereby converting the fluorine values into solid compounds, utilizing the heat in the gases to volatilize the excess aqueous content of the solution, separating by electrical precipitation the flue dust and the solid fluorine compounds from the remaining gases while the fluorine compounds are in suspension in the remaining gases, and thereafter separating the solid fluorine compounds from the flue dust.

9. The process of recovering fluorine values in waste gases intermingled with flue dust from the electrolytic production of aluminium, which comprises treating the flue dust and gases while hot from the furnace with an aqueous solution of sodium carbonate to form solid compounds with the fluorine values in the waste gases, utilizing the heat in the gases to volatilize the excess aqueous content of the solution, separating by electrical precipitation the flue dust and the solid fluorine compounds from the remaining gases while the fluorine compounds are in suspension in the remaining gases, and thereafter separating the solid fluorine compounds from the flue dust.

10. The process of recovering fluorine values in waste gases containing sulphur dioxide from the electrolytic production of aluminium, which comprises treating the gases while hot from the furnace with an aqueous solution of sodium carbonate in such quantity only as to neutralize substantially all of the fluorine values in the gases to form solid compounds with the fluorine values, the sulphur dioxide for the most part not being acted upon by the sodium carbonate thus supplied, utilizing the heat in the gases to volatilize the excess aqueous content of the solution, and separating the solid fluorine compounds from the remaining gases including the sulphur dioxide while the fluorine compounds are in suspension in the remaining gases.

11. The process of recovering waste products including fluorine values from waste gases containing sulphur dioxide from the electrolytic production of aluminium, which comprises treating the gases while hot from the furnace with an aqueous solution of sodium carbonate in such quantity only as to neutralize substantially all of the fluorine values in the gases to form solid compounds with the fluorine values, the sulphur dioxide for the most part not being acted upon by the sodium carbonate thus supplied, utilizing the heat in the gases to volatilize the excess aqueous content of the solution, separating by electrical precipitation the solid fluorine compounds from the remaining gases including the sulphur dioxide while the solid fluorine compounds are in suspension in the remaining gases, washing the said remaining gases containing the fluorine values and sulphur dioxide not neutralized by the said sodium carbonate with a sodium carbonate solution, treating the resultant solution with a calcium compound to precipitate calcium fluoride and calcium sulphate, separating said solids so precipitated from the solution, and using the solution as a wash solution for new waste gases from the furnace.

JULIUS WEBER.